UNITED STATES PATENT OFFICE 2,150,595

PROCESS OF PREPARING ALPHA ARYL PHTHALIDES

Paul R. Austin, Wilmington, and Paul L. Salzberg, Carrcroft, Del., assignors to E. I. du Pont de Nemours & Company, Wilmington, Del., a corporation of Delaware No Drawing. Application December 5, 1934, Serial No. 756,074

14 Claims. (Cl. 260—344)

This invention relates to the preparation of arylphthalides of the general formula:

where R is any aryl or substituted aryl radical and $R^1$ is a mono- or polynuclear aryl radical containing no meta orienting constituents.

Arylphthalides have previously been prepared by the reaction of phthalaldehydic acid with phenols, by the selective catalytic hydrogenation of benzoyl-o-benzoic acids, and by the reduction of benzoyl-o-benzoic acids with zinc and acetic acid.

This invention has as an object the provision of a new process whereby arylphthalides may be prepared. A further object of the invention is the preparation of arylphthalides substituted either in the phthalide nucleus and/or in the other aryl radical. A further object of the invention is the class of polynuclear aryl substituted phthalides.

These objects are accomplished by the following invention wherein an aromatic compound containing a replaceable hydrogen and containing no meta orienting substituents is reacted with an alpha-monohalogenated phthalide such as alpha-monochlorophthalide in the presence of an amphoteric metal halide catalyst.

In general alpha-arylphthalides may be prepared by the process of the present invention by heating a suitable alpha-monohalogenated phthalide such as alpha-monochlorophthalide, which may be obtained by the chlorination of phthalide, with an aromatic compound such as an aromatic hydrocarbon, in the presence of the amphoteric metal halide catalyst, such as zinc chloride, to a temperature sufficient to cause the two components to react. An inert solvent such as carbon bisulfide may be used as a diluent, if it seems advisable. After completion of the reaction which may require from 30 minutes to several days, the mixture is poured on ice and water, the metal chloride dissolved, and the excess solvent or unreacted hydrocarbon distilled. The product is then separated and purified by crystallization from an appropriate solvent.

Having outlined above the general principles and purposes of the invention, the following examples thereof are included for purposes of illustration and not in limitation:

Example 1

A mixture of 13 g. of alpha-monochlorophthalide, 15 g. of naphthalene, and 7 g. of zinc chloride was heated on an oil bath at 125° C. for one hour. The reaction mixture was poured into water and steam distilled to remove a small amount of naphthalene. The residue solidified and was crystallized from alcohol. An 87% yield of alpha-(1-naphthyl) phthalide was obtained. The product was further purified by crystallization from benzene or alcohol and gave a colorless product of melting point 137° C.

Example 2

One hundred grams of crude alpha-monochlorophthalide (shown by analysis to contain 0.5 mol of alpha-monochlorophthalide), 50 g. of zinc chloride, and 200 cc. of benzene were refluxed and stirred for four hours. The solution was poured onto ice-water and the solvent removed by distillation. The solution was allowed to cool and then filtered to remove the crude alpha-phenylphthalide. This was subsequently crystallized from alcohol. The yield obtained was 74% of theory. Recrystallization from benzene gave a pure product which melted at 116°–117° C.

Example 3

Nine grams of alpha-monochlorophthalide (pure), 5 g. of phenol, 2 g. of zinc chloride, and 50 cc. of carbon tetrachloride were allowed to stand in a reaction flask at room temperature for a period of seven days. Water was then added to the mixture and the carbon tetrachloride was distilled. After cooling, the water was decanted from the residue. It was then crystallized from alcohol and gave a 32% yield of alpha-(p-hydroxyphenyl) phthalide.

Example 4

A mixture of 11 g. of alpha-monochlorophthalide, 5 g. of biphenyl, and 5 g. of zinc chloride was heated for one-half hour at 100° C. There was a vigorous evolution of hydrogen chloride and the material became slightly resinous in appearance. Water was added to extract the zinc chloride and the product was crystallized from benzene-alcohol mixture. There was thus obtained a 20% yield of monophthalidylbiphenyl which melted at 209°–210° C.

Example 5

A mixture of 25 g. of alpha-monochlorophthalide (somewhat impure containing approximately 80% pure compound), 13 g. of naphthalene, and 5 g. of zinc chloride was heated for one-half hour at 80° C. and then one-half hour at 100° C. Twenty-five grams of alpha-monochlorophthalide was then added and the mixture heated for one hour at 125° C. The resulting product was cooled and triturated with alcohol to remove soluble impurities such as phthalide, phthalaldehydic acid, zinc chloride, etc., and the insoluble 1,5-diphthalidylnaphthalene, recrystallized from xylene, melted at 276° C. and was obtained in 56% yield.

The phthalide component of the reaction may be formulated as follows:

where R is an aromatic radical. The process is generally applicable whatever the composition of R so long as it is aromatic. Thus, R may be a benzene or naphthalene nucleus and it may contain substituents such as $NO_2$, Cl, Br, O-alkyl, O-aryl, $CH_3$, or other alkyl groups. R may even contain amino groups, provided these are masked by acetyl groups.

The other component of the reaction mixture may be any aromatic compound containing a replaceable hydrogen on the nucleus, provided it contains no meta orienting group. Thus, toluene, phenol, cresols, and especially metacresol, xylenes, and especially metaxylene, naphthalene, biphenyl, diphenyl oxide, acetanilid, chlorobenzene, bromobenzene, chloronaphthalene, naphthols, and the like may be employed. Where the aromatic compound contains an amino group, it is preferably first masked by acetylation before reacting with the phthalide.

While the process of the present invention is applicable to alpha-monohalogen substituted phthalides, the bromo and iodo compounds react much less conveniently than do the chloro compounds. For this reason the alpha-monochlorinated phthalides represent a preferred embodiment of the invention.

In the specification and claims the term "an alpha-monochlorophthalide" is used to represent the class of alpha-monochlorinated intramolecular lactones of aromatic ortho hydroxymethyl carboxylic acids, and the term "an alpha-monohalogenated phthalide" has a similar meaning. The term "alpha-monochlorophthalide" is restricted to the alpha-monochlorinated lactone of ortho hydroxymethylbenzoic acid.

The phthalidyl compounds prepared by the process of the present invention may be represented by the formula:

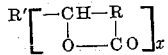

wherein $x$ is at least one, R is a bivalent aromatic hydrocarbon radical, and R' is a polynuclear aromatic radical. Since the compounds are prepared by the process of the present invention, R' is the residue of naphthalene, biphenyl, diphenyl oxide, chloronaphthalene, naphthol, etc. R' contains no meta orienting substituents since an aromatic compound containing a meta orienting substituent is not, so far as is known, reactive in the process of the present invention and may even, as in the case of nitrobenzene, be used as an inert diluent. R' must also be aryl, arylene, etc., i. e., it must have its valence or valences attached to the nucleus and not to a side chain since the process of the present invention attaches the phthalidyl radical to a nuclear carbon atom.

A wide variation in the temperature may be used in the condensation above described, some aromatic compounds reacting with much greater readiness than do others. In general, a temperature is sought at which the reaction between the alpha-monochlorophthalide and the aromatic derivative in question takes place with sufficient readiness but not with too great vigor. The temperature of reaction is readily ascertained by noting the evolution of hydrogen chloride which always accompanies the reaction. With a sensitive aromatic compound such as phenol or metacresol, a temperature of 25° C. is sufficient to carry out the reaction, while with naphthalene and benzene it is usually necessary to heat to about 80° C. in order that the reaction may proceed at a satisfactory rate. The temperature at which hydrogen chloride evolution begins is not however to be taken as the limiting maximum temperature, since naphthalene may be heated with alpha-monochlorophthalide to 150° C. and a satisfactory yield of naphthylphthalide obtained.

While zinc chloride is preferred as a catalyst in most of the reactions, since this milder catalyst tends to give a purer product, other amphoteric metal halide catalysts in general may be employed. Thus, aluminum chloride, ferric chloride, zinc chloride, stannic chloride, or antimony chloride may be employed. Materials giving rise to these amphoteric metal chlorides may also be employed. Thus, metallic zinc which upon reaction is converted to zinc chloride, may be employed, although of course not as satisfactorily. The reaction may be carried out either with or without a solvent. It is often, however, preferable to use a solvent since the reactants then come more intimately in contact with each other. The solvents are, of course, those which are inert to the reaction components under the condition of the reaction. Thus, carbon bisulfide, carbon tetrachloride, tetrachloroethylene, and nitrobenzene may be employed. Nitrobenzene is an example of an inert high-boiling solvent, and carbon bisulfide an example of an inert low-boiling solvent. Petroleum ether of various boiling points may also be employed. Either pure alpha-monochlorophthalide or the impure alpha-monochlorophthalide obtained by the chlorination of phthalide may be employed. The use of crude alpha-monochlorophthalide from the chlorination of phthalide containing preferably about 80% of pure alpha-monochlorophthalide, the remainder being phthalide, is advantageous since the phthalide is unreactive and may be readily separated from the arylphthalide produced, as a matter of fact, more readily than from the alpha-monochlorophthalide.

While the amount of catalyst to be used depends upon the individual reaction in question, an amount of catalyst is usually employed equal to the amount of alpha-monochlorophthalide used in the reaction. This insures a rapid completion of the process. The arylphthalides obtained according to the process of the present invention are particularly useful in the preparation of intermediates for anthraquinone dyes.

In the prior art the available arylphthalides are relatively few and because of the methods of preparation are necessarily limited. Thus, by the present method arylphthalides may be obtained having a wide variety of substituents including nitro, chloro, bromo, and other substituents. While in general only one phthalidyl radical is introduced into the aromatic residue, thus giving a compound of known structure, and avoiding mixtures of products, it is possible as in Example 5, to produce compounds containing more than one phthalidyl radical, the obviousness of whose utility as intermediates, needs no discussion.

The above description and examples are intended to be illustrative only. Any modification of or variation therefrom which conforms to the spirit of the invention is intended to be included within the scope of the claims.

We claim:

1. Process for the preparation of phthalidylnaphthalenes, which comprises heating naphthalene with approximately an equal weight of alpha-monochlorophthalide in the presence of zinc chloride for approximately one hour at approximately 125° C. and purifying the phthalidylnaphthalene by washing with water followed by steam distillation and crystallization from alcohol.

2. Process for the preparation of phthalidylnaphthalenes, which comprises heating naphthalene with alpha-monochlorophthalide in the presence of zinc chloride at a temperature at which hydrogen chloride is evolved.

3. Process for the preparation of phthalidyldiphenyls, which comprises heating diphenyl with alpha-monochlorophthalide in the presence of zinc chloride at a temperature at which hydrogen chloride is evolved.

4. Process for the preparation of phthalidyl substituted aromatic polynuclear hydrocarbons, which comprises heating alpha-monochlorophthalide with a polynuclear hydrocarbon in the presence of an amphoteric metal halide catalyst at a temperature at which hydrogen chloride is evolved.

5. Process for the preparation of phthalidyl substituted aromatic polynuclear hydrocarbons, which comprises heating an alpha-monochlorophthalide of the formula

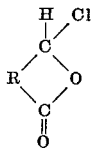

wherein R is a bivalent aromatic hydrocarbon radical with a polynuclear hydrocarbon in the presence of an amphoteric metal halide catalyst at a temperature at which hydrogen chloride is evolved.

6. Process for the preparation of phthalidylphenols, which comprises heating alpha-monochlorophthalide with phenol in the presence of zinc chloride.

7. Process for the preparation of phthalidylphenols, which comprises heating an alpha-monochlorophthalide of the formula

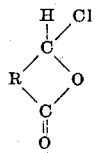

wherein R is a bivalent aromatic hydrocarbon radical with a phenolic compound containing the grouping

R—O— where R is an aromatic nucleus.

8. Process for the preparation of alpha-arylphthalides, which comprises reacting alpha-monochlorophthalide with an aromatic compound containing a replaceable hydrogen in the nucleus and containing no meta orienting group.

9. Process for the preparation of alpha-arylphthalides, which comprises reacting an aromatic compound containing a replaceable hydrogen in the nucleus and containing no meta orienting group with a phthalide having one chlorine and one hydrogen on the alpha carbon.

10. Process for the preparation of alpha-arylphthalides, which comprises reacting an aromatic compound containing a replaceable hydrogen in the nucleus and containing no meta orienting group with a phthalide having one halogen and one hydrogen on the alpha carbon.

11. Process of preparing diphthalidylnaphthalene which comprises reacting about 2 parts of alpha monochlorophthalide with about one part of naphthalene in the presence of one-fifth part of zinc chloride for about one hour at 80–100° C., adding a further 2 parts of alpha monochlorophthalide and heating for one hour at 125° C., and separating and purifying the resulting diphthalidylnaphthalene.

12. Process for the prepartion of alpha arylphthalides which comprises reacting alpha monochlorophthalide with an aromatic compound containing a replaceable hydrogen attached to the nucleus wherein the radicals attached to the aromatic nucleus are taken from the class consisting of hydrogen and ortho and para orienting groups.

13. Process for the preparation of alpha arylphthalides which comprises reacting an alpha monochlorophthalide of the formula

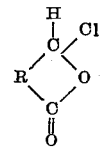

wherein R is a bivalent aromatic hydrocarbon radical with an aromatic compound containing a replaceable hydrogen in the nucleus wherein the radicals attached to the aromatic nucleus are taken from the class consisting of hydrogen and ortho and para orienting groups.

14. Process for the preparation of alpha arylphthalides which comprises reacting an aromatic compound containing a replaceable hydrogen in the nucleus wherein the radicals attached to the aromatic nucleus are taken from the class consisting of hydrogen and ortho and para orienting groups with a phthalide having one halogen and one hydrogen on the alpha carbon.

PAUL R. AUSTIN.
PAUL L. SALZBERG.